United States Patent [19]

Silvis et al.

[11] Patent Number: 4,802,835
[45] Date of Patent: Feb. 7, 1989

[54] APPARATUS FOR MAKING SOAP

[75] Inventors: Salvatore J. Silvis, Lambertville, N.J.; Jameel H. Jabbour, Marietta, Ga.

[73] Assignee: Colgate-Palmolive Company, New York, N.Y.

[21] Appl. No.: 117,217

[22] Filed: Nov. 4, 1987

Related U.S. Application Data

[63] Continuation of Ser. No. 855,593, Apr. 25, 1986, abandoned.

[51] Int. Cl.$^4$ ............................................. B29C 47/36
[52] U.S. Cl. ................................ 425/205; 264/211.11; 425/206; 425/209
[58] Field of Search ............. 264/211.11, 210.1, 210.2, 264/101, 102; 425/200–207, 209, 461

[56] References Cited

U.S. PATENT DOCUMENTS

| | | | |
|---|---|---|---|
| 480,149 | 8/1892 | Thoens | 425/207 |
| 1,083,275 | 1/1914 | Eberhard | 264/75 |
| 2,025,974 | 12/1935 | Fritz | 239/431 |
| 2,414,097 | 1/1947 | Garvey et al. | 264/211.1 |
| 2,767,437 | 10/1956 | Marshall | 264/211.11 |
| 3,130,448 | 4/1964 | Tomlinson . | |
| 3,450,022 | 6/1969 | Engel | 99/251 |
| 3,471,906 | 10/1969 | Henry | 425/200 |
| 3,487,505 | 1/1970 | Chisholm et al. . | |
| 3,577,308 | 5/1971 | Van Drunen et al. . | |
| 3,884,605 | 5/1975 | Grelon | 425/131.1 |
| 3,940,220 | 2/1976 | D'Arcangeli | 425/131.1 |
| 4,201,743 | 5/1980 | Perla et al. . | |
| 4,222,979 | 9/1980 | Hunt et al. | 264/75 |
| 4,422,773 | 12/1983 | Cassiday et al. | 366/341 |
| 4,459,094 | 7/1984 | Sanabria | 425/462 |
| 4,542,686 | 9/1985 | Bansal . | |
| 4,572,435 | 2/1986 | Thompson | 239/553.5 |

FOREIGN PATENT DOCUMENTS

| | | |
|---|---|---|
| 2839967 | 3/1980 | Fed. Rep. of Germany . |
| 38-16330 | 8/1963 | Japan . |
| 54-43605 | 12/1979 | Japan . |
| 132949 | 2/1960 | U.S.S.R. ............................ 425/461 |
| 760179 | 10/1956 | United Kingdom . |

OTHER PUBLICATIONS

Fluid Statics and Pressure Measurement, Chemical Engineers Handbook, 1973.

Primary Examiner—Jeffery Thurlow
Attorney, Agent, or Firm—Powell L. Sprunger

[57] ABSTRACT

An apparatus for making soap comprising, an extruder having a helical screw for passing the soap and forming an extrudate adjacent a downstream portion of the extruder, and a device for working or kneading the extrudate to remove residual screw lines and prevent cracking of soap formed from the extrudate.

9 Claims, 1 Drawing Sheet

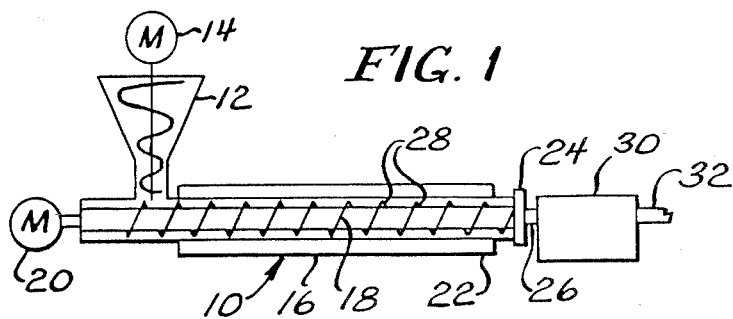
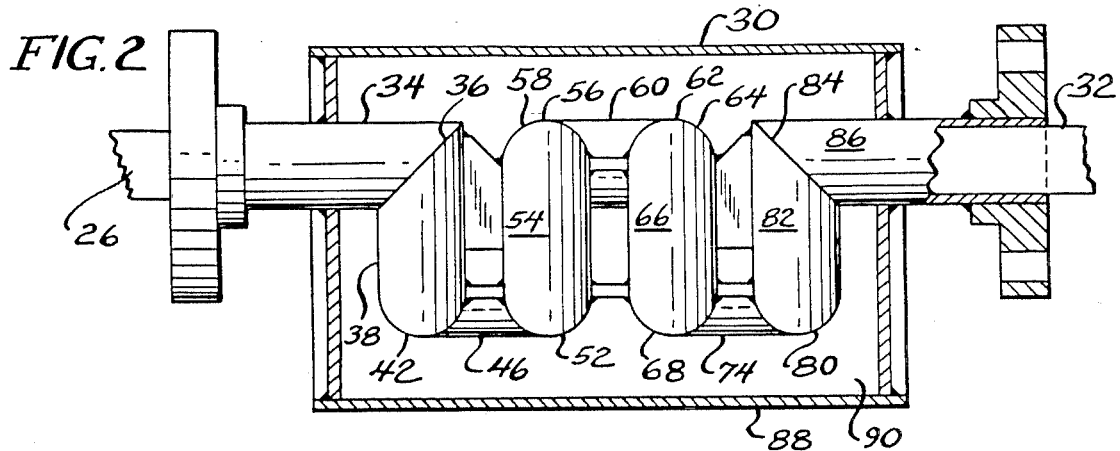
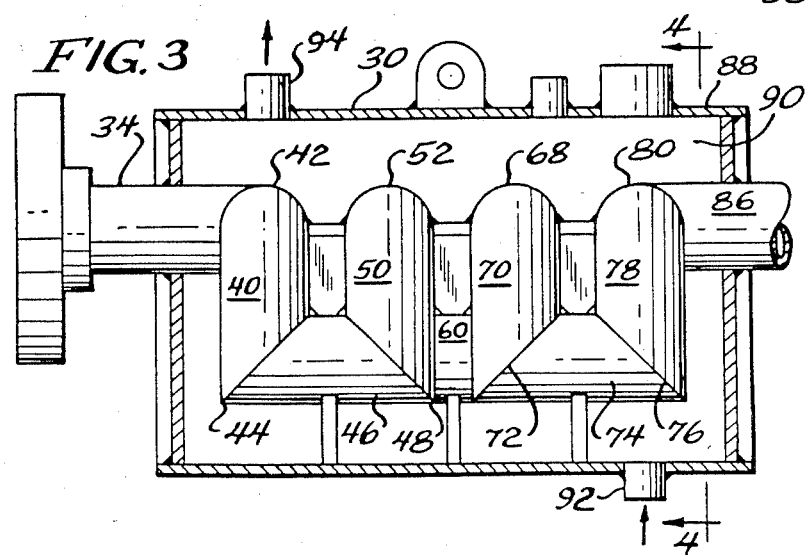
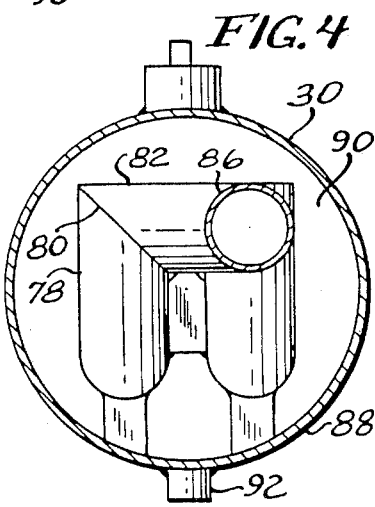
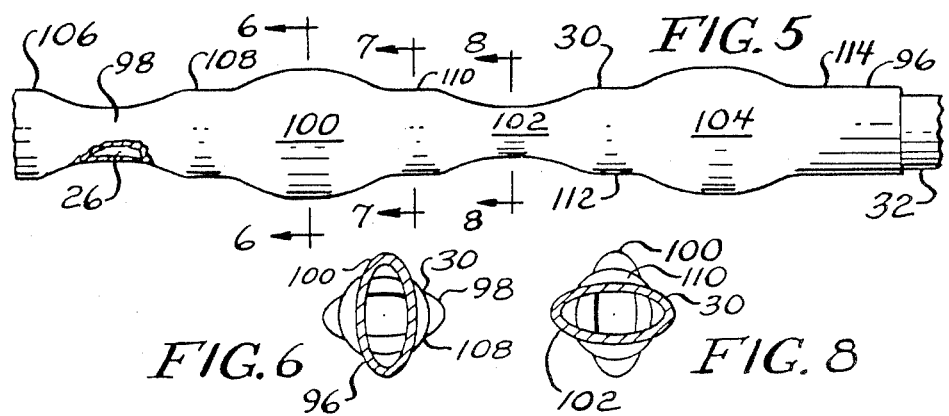

APPARATUS FOR MAKING SOAP

This is a continuation of application Ser. No. 855,593, filed Apr. 25, 1986, now abandoned.

BACKGROUND OF THE INVENTION

The present invention relates to an apparatus and method for making soap.

In the past, soap in paste form has been passed through an extruder having a driven screw, and the soap is formed into an extrudate by an orifice plate as it is compressed adjacent a downstream end of the extruder. The extrudate is then cut into billets and formed into bars by suitable dies or molds. As the soap is passed by the screw, a ribbon of soap is formed intermediate the flights of the screw. It has been found that as the ribbon is compressed to form the extrudate residual screw lines remain in the extrudate which may result in cracking of the soap during use, which of course is undesirable.

SUMMARY OF THE INVENTION

A principal feature of the present invention is an improved apparatus for making soap.

The apparatup of the present invention comprises, an extruder having a helical screw for passing the soap and forming an extrudate adjacent a downstream portion of the extruder, and means for working or kneading the extrudate.

A feature of the present invention is that the working or kneading means removes residual screw lines from the extrudate.

Another feature of the present invention is that the worked or kneaded extrudate prevents cracking of soap formed from the extrudate.

Another feature of the invention is the provision of methods for making the soap.

Further features will become more fully apparent in the following description of theeembodiments of this invention and from the appended claims.

DESCRIPTION OF THE DRAWINGS

In the drawings:

FIG. 1 is a diagrammatic view of an apparatus of the present invention;

FIG. 2 is a top plan view, taken partly in section, of a device for working an extrudate from an extruder of FIG. 1;

FIG. 3 is a side elevational view, taken partly in section, of the device of FIG. 2;

FIG. 4 is a sectional view taken substantially as indicated along the line 4—4 of FIG. 3;

FIG. 5 is an elevational view of a forxed pipe to knead the extrudate;

FIG. 6 is a sectional view taken substantially as indicated along the line 6—6 of FIG. 5;

FIG. 7 is a sectional view taken substantially as indicated along the line 7—7 of FIG. 5; and FIG. 8 is a sectional view taken substantially as indicated along the line 8—8 of FIG. 5.

DESCRIPTION OF THE PREFERRED EMBODIMENTS

Referring now to FIG. 1, there is shown an apparatus generally designated 10 for making soap according to the present invention. The apparatus 10 has a compacter 12 rotatably driven by a motor 14 to pass soap in paste or solid form into an extruder 16. The extruder 16 has a helical screw 18 rotatably driven by a motor 20 in order to pass the soap through the extruder 16. The soap is compressed adjacent a downstream end 22 of the extruder 16, and passes through an orifice plate 24 having an opening to form an extrudate 26. As the soap is passed by the screw 18, a ribbon of soap is formed intermediate flights 28 of the screw 18. It has been found that as the ribbon is compressed to form the extrudate 26 by the orifice plate 24, residual screw lines remain in the extrudate 26 which may result in cracking of the soap during use. In accordance with the present invention, the extrudate 26 is passed through a device 30 which works or kneads the extrudate 26 to form an output 32 of the device 30 with the residual screw lines removed in order to prevent cracking of the soap during use. The output 32 or worked or kneaded extrudate is cut into billets which are formed by suitable dies or molds into soap bars.

The device 30 for working the soap is illustrated in FIGS. 2-4 which passes the extrudate 26 through a series of bends defining a tortuous path for the extrudate 26 in order to remove residual screw lines. As the soap flows around the bends, the varying soap velocities from the inside of the feed to the outside cause a shearing action which knits the soap together in order to eliminate the residual screw lines.

The device 30 of FIGS. 2-4 has a first straight pipe section 34 connected by a bend 36 to a second straight pipe section 38 disposed to a side at a right angle to the first pipe section 34. The second pipe section 38 is connected to a downwardly extending third straight pipe section 40 by a right angle bend 42. The third pipe section 40 is connected by a right angle bend 44 to a fourth lower straight pipe section 46. The fourth pipe section 46 is connected by a right angle bend 48 to a fifth straight upwardly extending pipe section 50. The fifth pipe section 50 is connected by a right angle bend 52 to a laterally extending upper straight sixth pipe section 54. The sixth pipe section 54 is connected by a right angle bend 56 to a downwardly extending straight seventh pipe section 58. The seventh pipe section 58 is connected by a right angle bend to a lower straight eighth pipe section 60. The eighth pipe section 60 is connected by a right angle bend to an upwardly extending straight ninth pipe section 62. The ninth pipe section 62 is connected by a right angle bend 64 to a laterally extending tenth straight pipe section 66. The tenth pipe section 66 is connected by a right angle bend 68 to a downwardly extending straight eleventh pipe section 70. The eleventh pipe section 70 is connected by a right angle bend 72 to a lower forwardly extending straight twelfth pipe section 74. The twelfth pipe section 74 is connected by a right angle bend 76 to an upwardly extending straight thirteenth pipe section 78. The thirteenth pipe section 78 is connected by a right angle bend 80 to a laterally extending straight fourteenth pipe section 82. Finally, the fourteenth pipe section 82 is connected by a right angle bend 84 to a forwardly extending straight fifteenth section 86 to form the output 32 of the device 30. In this manner, the extrudate 26 is worked by passing it through a plurality of bends defining a tortuous path to remove residual screw lines from the extrudate 26 in the worked output 32.

The device 30 of FIGS. 2-4 is enclosed by a jacket 88 defining a chamber 90 enclosing the pipe sections and bends. As the extrudate 26 is worked by the device 30 the extrudate 26 is heated. As indicated by the arrows in the drawings of FIG. 3, water is input through a hollow tubular section 92 into the chamber 90, and is removed through a hollow tubular section 94 from the chamber 90 in order to cool or heat the worked extrudate 26 and maintain a desired temperature of the extrudate 26 as it is being worked.

A device 30 for kneading the extrudate 26 in order to remove the residual screw lines is illustrated in FIGS. 5-8. In this embodiment, an elongated pipe 96 has a plurality of pipe sections 98, 100, 102, and 104 formed into oval configurations. As shown, the elongate axis of the alternate oval pipe sections 100 and 104 are disposed at a right angle to the elongate axis of alternate oval pipe sections 98 and 102 to define varying cross sections of the pipe 96. In particular, the pipe 96 has the oval sections 100 and 102 with elongate axis disposed in the horizontal intermediate the oval pipe sections 100 and 104 with the elongate axis disposed in the vertical direction. In this manner, the extrudate 26 is kneaded by varying cross sections of the pipe 96 in order to remove residual screw lines from the extrudate 26 in the output 32 which is cut into billets and formed into bars. The oval sections in the pipe 96 may be separated by pipe sections 106, 108, 110, and 112 with a circular cross section, and the final pipe section 114 may have a circular cross section in order to form the output 32 into a cylindrical configuration.

Thus, in accordance with the present invention, the extrudate of an extruder is worked or kneaded in order to remove residual screw lines formed by a screw of the extruder to prevent cracking of soap formed from the extrudate during pse of the soap.

According to a method of making soap of the invention, the soap is passed through an extruder which forms screw lines in an extrudate of the extruder, and the soap is worked to remove the screw lines from the extrudate and prevent cracking of soap formed from the extrudate.

According to another method of making soap of the invention, the soap is passed through an extruder which forms screw lines in an extrudate of the extruder, and the soap is kneaded to remove the screw lines from the extrudate and prevent cracking of soap formed from the extrudate.

The foregoing detailed description is given for clearness of understanding only, and no unnecessary limitations should be understood therefrom, as modifications will be obvious to those skilled in the art.

We claim:

1. An apparatus for making soap, comprising:
an extruder having a helical screw for passing the soap directly from the screw to an orifice plate having an opening and forming an extrudate by the orifice plate adjacent a downstream portion of the extruder; and
static means for working the extrudate to remove residual screw lines and prevent cracking of soap formed from the extrudate, comprising a plurality of generally straight pipe sections connected by bends, with some of said pipe sections being disposed in first and second spaced planes, and other of said pipe sections connecting the first and second planes.

2. The apparatus of claim 1 including meahs for cooling the extrudate while it is being worked.

3. The apparatus of claim 1 wherein the working means comprises means defining a tortuous path for the extrudate.

4. The apparatus of claim 1 wherein the working means comprises means defining a series of bends through which the extrudate is passed.

5. The apparatus of claim 1 wherein the working means comprises a plurality of generally straight pipe sections connected by bends.

6. The apparatus of claim 5 wherein the bends dispose adjacent pipe sections at generally right angles.

7. An apparatus for making soap, comprising:
an extruder having a helical screw for passing the soap and forming an extrudate adjacent a downsteam portion of the extruder; and
static means for kneading the extrudate to remove residual screw lines and prevent cracking of soap formed from the extrudate, comprising means for forming the extrudate into varying cross sections comprising an elongate pipe having a plurality of oval sections disposed along the pipe, with the elongate axis of some of the oval sections being disposed at different angles to the elongate axis of other oval sections, and thereafter forming the extrudate into a uniform cross section.

8. The apparatus of claim 7 wherein the elongate axis of some oval sections are disposed generally at right angles to the elongate axis of adjacent oval sections.

9. The apparatus of claim 7 wherein alternate oval sections have their elongate axis disposed generally at right angles to the elongate axis of oval sections intermediate the alternate oval sections.

* * * * *